Oct. 3, 1950        E. E. GYANA        2,524,124
CENTRIFUGAL LIQUID RETAINER
Filed Oct. 2, 1946
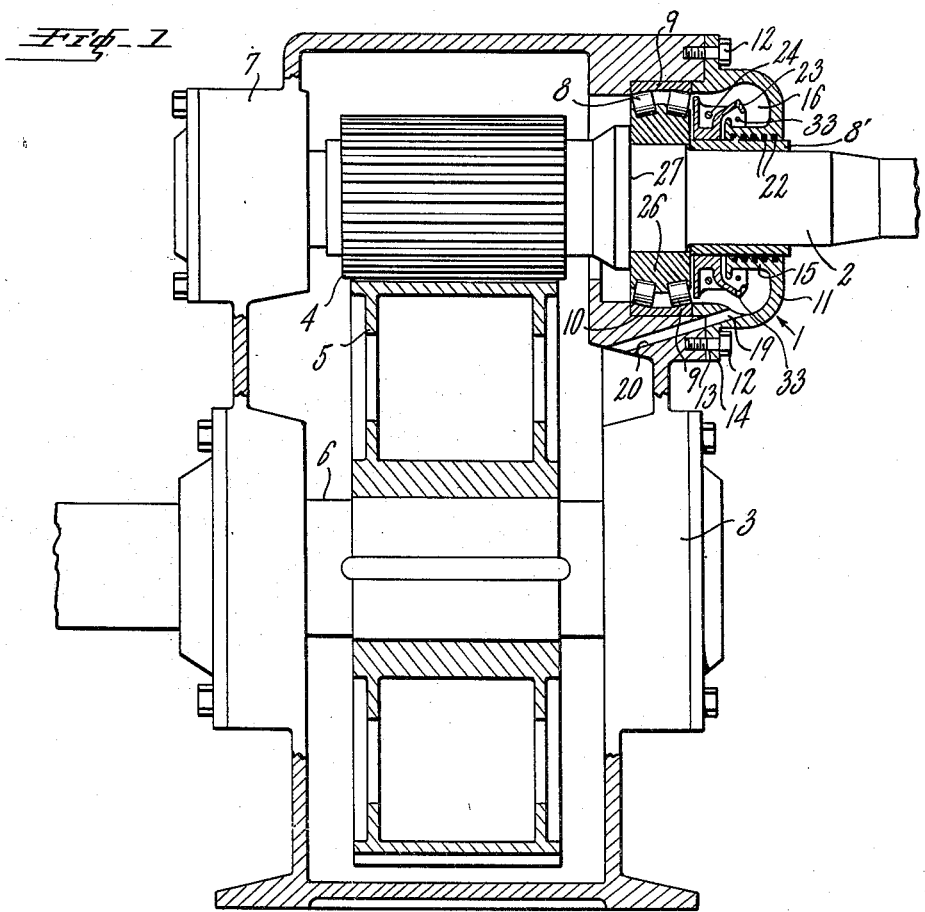
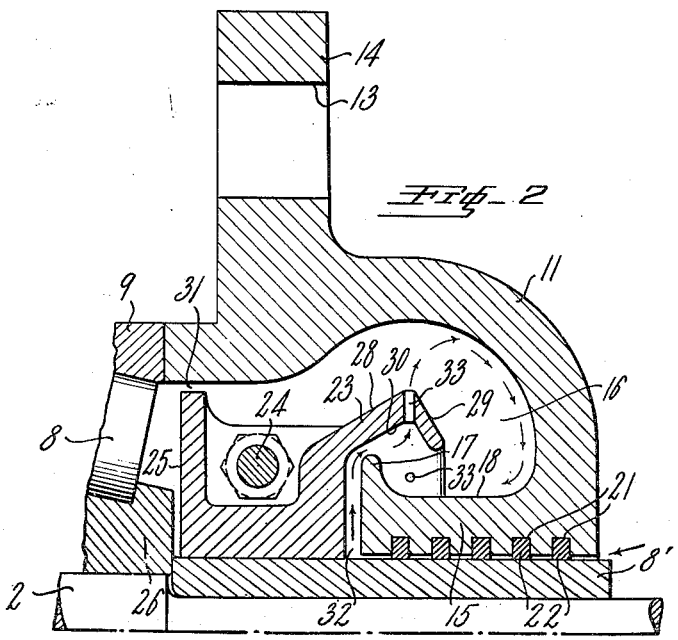
INVENTOR
EUGENE E. GYANA
BY
Henry P. Truesdell
ATTORNEY Patented Oct. 3, 1950

2,524,124

UNITED STATES PATENT OFFICE 2,524,124

CENTRIFUGAL LIQUID RETAINER

Eugene E. Gyana, Manhasset, N. Y., assignor to United States Rubber Company, New York, N. Y., a corporation of New Jersey Application October 2, 1946, Serial No. 700,667

1 Claim. (Cl. 286—5)

My invention relates to a seal for rotating shafts and more particularly to a liquid seal of the type employed with rotating shafts where it is necessary to prevent liquid in a housing leaking past a rotating shaft extending through the wall of the housing.

It is customary to pack such rotating shafts with material held in a packing gland which frictionally engages the shaft to prevent leakage of lubricant, or other liquid, from a housing along the length of the shaft. However, such constructions are not entirely satisfactory due to the necessity of frequent renewal of the packing, and due to the fact that a considerable frictional drag may be imposed on the shaft when tightening the packing to insure a fluid tight seal. My invention overcomes these deficiencies by providing a liquid seal which does not impose a frictional drag on the rotating shaft and which is effective in preventing leakage of liquid along the shaft from the interior to the exterior of a housing.

Therefore, it is an object of my invention to provide a new and improved seal for rotating shafts wherein substantially no frictional restraint is placed on the shaft.

It is another object of my invention to provide a seal for a rotatable shaft, the seal being so constructed and arranged as to prevent entry of dirt or other contamination into the housing surrounding the shaft.

A further object of my invention is to provide a liquid seal having relatively few parts, which may be manufactured at low cost, and which may replace existing packing in structures for rotatable shafts without modification or reworking of the bearing structure.

In the accompanying drawing, Fig. 1 shows a seal constructed in accordance with my invention mounted in association with a shaft forming part of a gear housing; and Fig. 2 is an enlarged view in section through a part of the seal.

Referring to the drawing, I have illustrated a liquid seal 1, constructed in accordance with my invention and which is operatively associated with a driving shaft 2 forming part of a gear housing 3. The driving shaft 2 is rotated by means of a motor (not shown) and carries a spur gear 4 meshing with a drive gear 5 mounted on a driven shaft 6. The particular arrangement of gears within the housing 3 forms no part of the present invention and is simply illustrative of one particular use to which my invention may be put. One end of the drive shaft 2 is mounted within the gear housing in any suitable bearing 7; the other end is carried by a roller bearing 8 and extends through the wall of the gear housing for attachment to the driving motor. A retainer 8', fastened to the shaft in any suitable manner holds the bearing in position. In normal operation the gear housing 3 is partially filled with a lubricant, such as a thin oil, and the rotating gears 4 and 5 splash the lubricant to all rotating parts and bearings within the housing. In this way a portion of the lubricating oil is brought into engagement with the roller bearing 8 where it has a tendency to leak through the bearing to the outside of the gear housing. Also there is a tendency for the lubricating oil to work its way along the shaft 2 between the shaft and the inner raceway of the bearing. My liquid seal is particularly designed to prevent any of the lubricating liquid which is forced through or around the bearing 8 from reaching the outside of the gear housing. Any lubricating liquid which travels along the shaft 2 is returned to the sump of the gear housing by the action of the liquid seal 1.

Turning now to the details of the construction of my liquid seal and the manner in which it is applied to the housing, it will be seen that the outer raceway 9 of the roller bearing 8 is held seated in position in a recess 10 in the housing by means of a cap 11 which surrounds the shaft 2 and which bears against the outer raceway 9. The cap 11 is secured to the housing 3 in any suitable manner, as by cap screws 12, which extend through openings 13 in a flange 14, formed integrally with the cap. Referring to Figure 2, it will be seen that a portion 15 of the cap 11 extends inwardly from the outer face of the cap along the length of the shaft 2 and forms an opening through which the drive shaft and bearing retainer extends. In addition, the portion 15 acts to form a collecting chamber or cavity 16. In part, the cavity is formed by a lip 17 extending inwardly from the shaft engaging portion 15. It will be seen that the lip 17 and the wall of the cavity 16 form, in effect, a trough 18 which is annular in shape within the cap 11 and which extends around the drive shaft 2. Its purpose is to form a collecting surface for any lubricating oil or liquid which enters the cavity 16 and which will serve to guide the liquid to the bottom of the cavity where it may drain off through the opening 19, as shown in Fig. 1. The gear housing 3 is likewise provided with a drain opening 20 in alignment with the opening 19 so that the lubricating oil may be drained back to the sump in the bottom of the gear housing.

In order to prevent entry of dust and dirt into the interior of the cap 11 along the opening adjacent the retainer 8', the portion 15 is provided with a plurality of annular slots 21 which form, in effect, a dirt collecting comb. The slots in the comb may be filled with hard metallic soap-type grease rings 22 or, alternatively, they may be filled with a conventional fabric packing. There will be no appreciable wear of the packing because all loading on the shaft is taken by the bearing 8.

The seal includes a "slinger" or impeller 23 fastened to the drive shaft 2 and which rotates with the shaft to throw off any oil passing the bearing 8 into the cavity 16 for return to the sump in the gear case. The impeller is formed as an annular member surrounding the shaft. In the form of the invention illustrated, the impeller is made in two parts which are fastened in position around the drive shaft by means of bolts 24. It should be manifest, however, that the impeller may be cast in a single piece and frictionally mounted in position on the shaft. One end of the impeller is provided with a flat barrier surface 25 which acts to return part of the oil passing through the bearing. At its other end the impeller is provided with an inclined surface 28 which is disposed at an angle extending away from the drive shaft 2. Any oil reaching the surface 28 is thrown to the wall of the cavity 16 by centrifugal force as the impeller rotates at high speed with the shaft. In addition, the impeller is provided with a second inclined surface 29 which extends at an angle toward the drive shaft 2. The two surfaces 28 and 29 form, in effect, a flange which overhangs the lip 17 of the cap and which extends into the cavity 16. From another viewpoint, it may be said that the surfaces 28 and 29 form a convex surface on one side of the impeller and a concave surface 30 on the other side. The concave surface 30 of the impeller faces the lip 17 and trough 18 of the cap so that these portions of the impeller and the cap form a labyrinth which acts to hold any liquid within the interior of the seal in a manner now to be described.

As the shaft and impeller rotate, it will be seen that a considerable portion of the lubricating oil working its way through the bearing 8 will be returned by the barrier surface 25 of the impeller. However, some of the oil will leak past a clearance space 31 between the impeller and the cap 11 and thence along the surface of the impeller to the inclined surface 28. At this point the centrifugal force created by the rapidly rotating impeller will throw the oil to the wall of the cavity 16 where it will either be returned to the bearing 8 or else will flow along the wall of the cavity to the trough 18 and then eventually find its way by gravity to the drain opening 19 in the bottom of the cap 11. Even though a considerable quantity of oil is collected in the cavity 16 there will be no danger of the oil reaching the surface of the drive shaft by leakage between the impeller and cap due to the fact that the lip 17 retains the oil in the cavity within the trough 18.

If the impeller is not tightly sealed to the drive shaft it may be that a certain amount of the lubricating oil will work its way along the length of the bearing retainer 8' in any minute spaces existing between the surfaces of the retainer and the impeller 23. When the oil reaches the outer edge of the impeller it will leak into a passageway 32 formed by the clearance space between the rotating impeller and the fixed portion 15 of the cap. Centrifugal force will cause the oil to flow along the passageway 32 to the outer surface of the impeller where it will collect on the concave surface 30. A plurality of holes 33 are formed in the concave surface and extend through the impeller to permit expulsion of any oil which collects in the cavity 30 to the interior of the cavity 16. In this way any oil which leaks out between the impeller and the drive shaft is quickly returned to the cavity 16 and thence to the gear housing 3.

Another important feature of my invention is the provision of means for creating a partial vacuum within the seal. The purpose of this vacuum is to assist in preventing leakage of liquid past the seal by creating a tendency for air or liquid to enter the seal rather than flow out of it. More specifically, the impeller is provided with means for creating a vacuum within the seal. By providing a vacuum within the cap 11 there is a tendency for air to enter the seal along the length of the opening through which the drive shaft extends. This further prevents the leakage of oil outside the seal. To this end, when the impeller rotates the openings 33 act as a centrifugal blower. The volume of air bound by the concave surface 30 of the impeller is forced outwardly through the holes in a series of continuous jets. This action increases the pressure in the cavity 16 to some extent which pressure is relieved through the drain opening 19. A corresponding low pressure zone is created in the passageway 32 and particularly at the point where the drive shaft 2 and bearing retainer 8' extend through the comb formed by the slots 21. The result of this low pressure zone is to produce a tendency for any liquid reaching the passageway 32 to creep inwardly along the surface of the impeller 23. Likewise, any liquid which is disposed along the length of the comb is drawn toward the passageway 32 and does not leak to the exterior of the seal. In fact, the creation of the low pressure area in the passageway tends to draw air into the interior of the seal through the opening along the length of the comb and then upwardly along the impeller and through the openings 33 to the interior of the cavity 16 in the manner indicated by the arrows in Fig. 2. Thus, not only does the impeller act positively to throw any liquid leaking along the shaft into the interior of the seal but also the impeller is so constructed as to create a partial vacuum at a point in the seal where it will act to draw air and liquid into the seal rather than to permit leakage to the exterior of the seal.

My invention provides a seal which is simple in construction and which is very effective in preventing leakage of lubricating oil or other liquids along a rotating shaft. It utilizes only one moving part which is permanently fastened to the shaft. It is not necessary to replace packings frequently. The packings simply engage the drive shaft to form a mechanical barrier against the entry of dirt into the seal. The seal does not impose any frictional drag on the drive shaft since the impeller rotates freely in the cavity.

Having thus described my invention, what I claim and desire to protect by Letters Patent is:

In a mechanism for preventing the flow of liquid along a shaft rotating within and extending from a bearing housing containing a body of said liquid, the combination of a stationary cap surrounding the said shaft at the point where the shaft extends from the bearing housing, said cap having a dirt collecting comb in engagement with the shaft, the said comb being provided with a plurality of slots containing anti-friction packing, and the said stationary cap forming an annular collecting chamber surrounding the shaft, an annular impeller within said collecting chamber, said impeller being provided with a concave surface facing the shaft and having a series of openings disposed around the periphery thereof in the concave surface, and said impeller also having a barrier surface disposed between the collecting chamber and the bearing housing to partially close off the collecting chamber from the bearing housing so that the collecting chamber remains free from large quantities of liquid, the aforesaid openings in the concave impeller surface acting to produce a partial vacuum at a point adjacent the aforesaid anti-friction packing, whereby any fluid tending to flow along the shaft past the anti-friction packing is drawn back into the collecting cavity, and a drainage opening in the wall of the collecting cavity leading to the bearing housing for returning collected liquid thereto under the influence of pressure developed within the cavity by the rotating impeller.

EUGENE E. GYANA.

REFERENCES CITED

The following references are of record in the file of this patent:

UNITED STATES PATENTS

| Number | Name | Date |
| --- | --- | --- |
| 1,463,018 | Junggren | July 24, 1923 |
| 1,562,642 | Holmstrom | Nov. 24, 1925 |
| 1,708,710 | Vincent | Apr. 9, 1929 |
| 1,803,459 | Boland | May 5, 1931 |
| 1,966,923 | Couch | July 17, 1934 |